United States Patent
Blaszyk et al.

[11] Patent Number: 5,940,208
[45] Date of Patent: Aug. 17, 1999

[54] SWITCHABLE FIBER OPTIC DEVICE FOR FIBER TRANSMISSION SYSTEM AND COMPONENTS THEREOF

[75] Inventors: Robert P. Blaszyk, Horseheads; Douglas W. Hall; Michael Yadlowsky, both of Corning, all of N.Y.

[73] Assignee: Corning Incorporated, Corning, N.Y.

[21] Appl. No.: 08/813,184

[22] Filed: Mar. 10, 1997

Related U.S. Application Data

[60] Provisional application No. 60/015,394, Apr. 2, 1996, and provisional application No. 60/014,855, Apr. 4, 1996.

[51] Int. Cl.⁶ .............................. G02B 6/00; H04B 10/00; G02G 6/26
[52] U.S. Cl. .................. 359/341; 359/117; 359/128; 385/17; 385/20; 385/32
[58] Field of Search ................................ 359/117, 128, 359/341; 385/16, 17, 20, 32, 48

[56] References Cited

U.S. PATENT DOCUMENTS

| | | | |
|---|---|---|---|
| 5,131,069 | 7/1992 | Hall et al. | 385/142 |
| 5,291,569 | 3/1994 | Goutzoulis et al. | 385/39 |
| 5,361,319 | 11/1994 | Antos et al. | 385/123 |
| 5,402,256 | 3/1995 | Spanke | 359/140 |
| 5,608,562 | 3/1997 | Delavaux et al. | 359/161 |
| 5,633,741 | 5/1997 | Giles | 359/124 |
| 5,717,510 | 2/1998 | Ishikawa et al. | 359/161 |

FOREIGN PATENT DOCUMENTS

674404 A1  9/1995  Russian Federation .

OTHER PUBLICATIONS

Goutzoulis et al, Optical Engineering, vol. 28, #11, pp. 1193–1202, Nov. 1989.
Izadpanah et al, Electronics Letters, vol. 28, #15, pp. 1469–1471: abst. only herewith, Jul. 16, 1992.

*Primary Examiner*—Nelson Moskowitz
*Attorney, Agent, or Firm*—William Greener

[57] ABSTRACT

A fiber optic device for use in fiber optic transmission systems and components thereof includes a pass-through fiber and one or more lengths of circulating fiber connected to the pass-through fiber by respective optical switches for selectively routing an optical signal through the circulating fiber lengths as it propagates along the pass-through fiber. The circulating fiber lengths are either dispersion compensating fibers or fibers doped with a substance that will amplify or absorb the optical signal in the respective presence or absence of a pump signal. The invention thus allows various amounts of dispersion or gain (absorption) to be selectively switched into or out of use depending upon requirements at the time. For example, an amplifying component could serve as a pre- or power- or in-line amplifier device depending on the lesser or greater amount of gain fiber elected by switching. The device can be interconnected with the transmission system or components thereof via splicing to of the ends of the pass-through fiber or via optical switches connected to the ends of the pass through fiber.

10 Claims, 3 Drawing Sheets

SWITCHABLE FIBER OPTIC DEVICE FOR FIBER TRANSMISSION SYSTEM AND COMPONENTS THEREOF

This application claims benefit of provisional application No. 60/015,394 filed Apr. 2, 1996 and provisional appliaction No. 60/014,855 filed Apr. 4, 1996.

FIELD OF THE INVENTION

This invention relates generally to optical fiber transmission systems and signal amplifying components used therein, and more particularly to a fiber optic device for use in such a system or component thereof that provides for selectively effecting variable amounts of signal gain, dispersion or filtering (absorption) therein.

BACKGROUND OF THE INVENTION

Telecommunication transmission systems utilizing fiber optic technology have surpassed wire based systems as the industry standard because of their desirable characteristics. For example, systems employing fiber optic waveguides are capable of providing much higher bandwidth than wire based systems, they are relatively immune to electromagnetic interference, and they are more secure than their wire based counterparts. Furthermore, components such as optical fiber amplifiers are overshadowing older style repeaters and regenerators due to their demonstrated advantages.

When optical fiber transmission systems were first introduced, they exhibited bandwidth capabilities that easily met contemporary requirements.

Present day bandwidth requirements, however, have increased dramatically and present new challenges over low bandwidth systems such as dispersion control.

As is well known, optical fibers exhibit dispersion; that is, different wavelengths of a signal carried by a fiber propagate at different velocities through the fiber. While dispersion effects of a low bandwidth signal may be relatively insignificant, signal dispersion can be a limiting factor as the bandwidth of the signal increases. For example, modern optical fiber transmission systems can be provided for transmitting data at rates of more than 2.5 gigabits per second. Dispersion compensation is often necessary for reliable, error free transmission at data rates exceeding 2.5 gigabits per second. One method of compensating for dispersion in long haul fiber optic transmission systems is to provide a predetermined length of dispersion compensating fiber in the system. If the dispersion characteristics of a section of a transmission system are known, then a suitable length of dispersion compensating fiber can be provided to reduce or eliminate the overall system dispersion. Such a teaching is set forth in Antos U.S. Pat. No. 5,361,234, granted on Nov. 1, 1994, which is incorporated herein by reference.

As is known, standard transmission fiber is designed for minimum attenuation for signals in the 1550 nm band transmission window, and for minimum dispersion in the 1300 nm band window. Dispersion effects therefore become an issue since most transmission occurs in the 1550 nm window. New long haul fiber transmission systems can be designed to incorporate dispersion shifted fiber to control dispersion at the longer transmission wavelengths. However, millions of kilometers of fiber optic transmission lines are already installed wherein the fiber is minimized for dispersion in the 1300 nm window. Transmission signals in the 1550 nm band therefore exhibit dispersion in amounts that are large enough to require compensation. Moreover, as the transmission signal data rate increases from, say, 2.5 Gbit/s to very high data rates such as 40 Gbit/s, for example, the amount of tolerable dispersion in the system decreases, making the tunability of dispersion compensation a desirable feature. Heretofore, no convenient method has existed for either ad hoc in-field compensation of, or, in-field adjustable tuning of, dispersion in a fiber optic transmission system.

Another inherent characteristic of fiber optical transmission systems is signal attenuation due to loss mechanisms in optical fiber waveguides. In fact, minimization of dispersion and attenuation are two of the chief design challenges associated with both new and existing fiber transmission systems. Due to fiber attenuation, signal regenerators in general and fiber optical amplifiers in particular, are integral components of fiber transmission systems. In fact, fiber optical amplifiers are typically present either alone or in combination at the beginning and end of the system, respectively, as power and pre-amp, and intermediate thereof as an in-line amplifier. Contemporary fiber amplifiers include a fiber waveguide that is doped with a rare earth element (gain fiber) such as erbium, for example. The gain fiber is pumped by an excitation source having a wavelength less than the principal wavelength of the communication signal carried by the fiber. Both the pump and signal wavelengths propagate along the same fiber path. Additional lengths of gain fiber can be added to the signal transmission path to provide further amplification of the communication signals. For instance, depending upon the components that are upstream and downstream of a fiber amplifier, and their distances from the amplifier, a power amplifier could be utilized as an in-line amplifier by adding an additional length of gain fiber to the power amplifier gain fiber. Likewise, additional lengths of doped fiber could be added to the system wherein they could provide a filtering effect on one or more wavelengths in the signal wavelength band for gain spectrum shaping or gain equalization which is important in WDM applications, depending upon the existence or depletion of pump signal in those fibers. Such a teaching is set forth, for example, in Hall U.S. Pat. No. 5,131,069. However, as in the case of dispersion adjustment and tuning, heretofore no convenient method has existed for the ad hoc, in-field adjustment or tuning of communication signal gain or signal and/or pump filtering in a fiber optic transmission system.

A further limitation of amplifier component or gain block modules used in presently installed systems involves dynamic gain tilt in multi-channel applications; i.e., a change in the gain spectrum with changes in component or module operating conditions. An amplifier can be designed to provide some optimum level of gain uniformity over a given operation band, but this can generally only be achieved for a specific set of signal input powers and pump powers. Therefore, if deployment requirements include a change in signal gain, the gain uniformity will degrade as the overall gain spectrum changes. Consider, for example, an optimized multi-channel fiber transmission system including at least two amplifier stages typically separated by a distance of about 90 km. Over this length of fiber, typical signal loss due to attenuation and other factors will be about minus 23 dB. Each amplifier stage is further limited to a power output of about 8 dBm/channel because of induced non linear effects in the fiber when output power is greater than about 8 dBm. Such non linear effects include, for example, self- and cross-phase modulation and four-wave mixing phenomena which are highly detrimental to low error signal reception. By simple arithmetic then, the input power at the next downstream amplifier will be minus 15 dBm. For these input, loss and output power values, an average saturated inversion level in a pumped, doped amplifying fiber can be maintained to provide a relatively flat gain spectrum from about 1536 nm to 1560 nm when the fiber is doped with erbium.

Consider now the scenario in which the distance between gain stages must be reduced to, say, 50 km due to a constraint on amplifier placement (e.g., a mountain or lake). A typical attenuation over this reduced distance would be minus 13 dB, resulting in a signal power at the input of the next downstream gain stage equal to minus 5 dBm. However, unless the gain of the amplifier stage can be reduced such that the power output remains at about 8 dBm, by, for example, reducing the drive current to the doped fiber pumping source, induced non linear effects in the fiber again become a problem. It will be appreciated, though, that reducing the gain in the amplifier stage by decreasing the average inversion level will lead to dynamic gain tilt as described above, which must be minimized for multi-channel system operation. A solution to this problem not heretofore available is presented by the disclosed invention by providing a gain platform or optical amplifier having a selectively switchable route through one of at least two differing lengths of doped fiber whereby the amplifier output power can be maintained at the desired level substantially independently of the higher or lower input signal power to maintain the desired gain uniformity over the desired operating band.

It is therefore an object of this invention to provide a fiber optic device having switchable characteristics for field selecting variable amounts of optical signal gain, signal filtering and/or signal dispersion, in a fiber optic transmission system and/or an amplifying component thereof.

This invention has as a further object to provide a component of a fiber transmission system, such as a fiber optical amplifier, or active or passive gain platform, that allows for variable, field selectable levels of optical signal gain, signal filtering and/or signal dispersion by selectively routing a signal through different fiber lengths having similar or different characteristics.

It is a still further object of this invention to provide a fiber optic transmission system having variable, field switchable amounts of optical signal gain, signal filtering and/or signal dispersion.

SUMMARY OF THE INVENTION

Briefly stated, and in accordance with a presently preferred embodiment of the invention, an optical fiber device with switchable operating characteristics comprises an input fiber; a 1×N optical switch optically connected to a second end of the input fiber at a single connection point of the switch; a first route fiber having known characterizing parameters optically connected to a first connection point of the switch; an $N^{th}$ route fiber having known characterizing parameters that are different from any other route fiber, connected to an $N^{th}$ connection point of the switch wherein a signal propagating in the input fiber towards the route fibers can be selectively switched to propagate in one of the N route fibers; an output fiber; and means for optically interconnecting the N route fibers with a first end of the output fiber. In a preferred aspect of this embodiment, the 1×N optical switch will be a 1×2 optical switch. These types of switches are well known to those skilled in the art and require no detailed discussion other than identifying their improved crosstalk performance over well known N×N optical switches. Moreover, the N route fibers will preferably be doped with a substance that will fluoresce in the presence of pump or excitation energy. Preferred doping substances include rare earth elements, for example, erbium, neodymium, praseodymium and others.

In accordance with another embodiment of the invention, an optical fiber device with switchable operating characteristics comprises a first fiber for propagating a wavelength of light, and a circulating length of fiber for propagating a wavelength of light, connected to the first fiber between one end of the first fiber and the other end of the first fiber via an optical switch for selecting an optical path from the first fiber to and around the circulating length of fiber and again along the first fiber when the switch is in an "on" position, and for selecting an optical path along the first fiber and not to or along the circulating length of fiber when the switch is in an "off" position. In respective aspects of the disclosed embodiment, the device includes a circulating length of dispersion compensating fiber, or doped fiber that can act as an optical signal gain fiber or optical signal filtering fiber depending on the dopant type and concentration, and the presence or absence of optical pump energy. When the device contains more than a single length of circulating fiber, each length may be different in a particular manner; for example, if the device contains three lengths of dispersion compensating fiber having a known dispersion, each of the three lengths might be of different length for providing an overall cumulative dispersion compensating effect depending upon how few or many of the lengths were switched into the optical propagation path. Of course, a similar result could be obtained by a variable number of identical lengths of circulating fiber. It will be appreciated by one skilled in the art that other circulating fiber length parameters such as dopant type and/or concentration, for example, may be the same or different in each length of fiber. In each case, however, the optical switch, known per se, may be a multiplexing/demultiplexing switch for WDM applications.

In another embodiment of the invention, an apparatus for amplifying and/or filtering an optical signal includes an optical pump signal carrying fiber, an optical data signal carrying fiber, an optical data signal gain fiber stage doped with a substance that will fluoresce in the presence of a pump signal, an optical coupler for interconnecting the pump signal carrying fiber and the data signal carrying fiber to at least one end of the gain fiber stage, and a device including a first fiber having one end connected to an end of the gain fiber stage and a circulating length of fiber connected to the first fiber via an optical switch, as described above, for selecting an optical path from the first fiber to and around the circulating length of fiber and again along the first fiber when the switch is in an on position and for selecting an optical path along the first fiber and not along or around the circulating length of fiber when the switch is in an off position. In respective aspects of this embodiment, the one or more circulating lengths of fiber can be parameterized exactly as described above for providing a gain platform or fiber optical amplifier having switchable gain, filtering or dispersion compensating characteristics. In an alternative aspect of this embodiment, the gain platform or fiber amplifier may contain additional fiber gain stages, as is well known in the art, in which case the switchable device would preferably include circulating lengths of dispersion compensating or filtering fiber.

In an alternative embodiment of the invention, a fiber optic transmission system includes a transmitter and a receiver, at least first and second portions of transmission fiber interconnected to the transmitter and receiver, respectively, and a device including a first fiber having one end interconnecting with the first portion of transmission fiber, and having another end interconnecting with the second portion of transmission fiber, and a circulating length of fiber connected to the first fiber as described above via an optical switch for selecting an optical path from the first fiber to and around the circulating length of fiber and again along the first fiber when the switch is in an on position, and for selecting an optical path along the first fiber and not along or around the circulating length of fiber when the switch is in an off position. In this embodiment, the length(s) of circulating fiber are preferably dispersion compensating fiber.

BRIEF DESCRIPTION OF THE DRAWINGS

While the novel aspects of the invention are set forth with particularity in the appended claims, the invention itself, together with further objects and advantages thereof may be more readily comprehended by reference to the following detailed description of the presently preferred embodiment of the invention, taken conjunction with the accompanying drawings, in which:

DETAILED DESCRIPTION OF THE INVENTION

Figure 1:
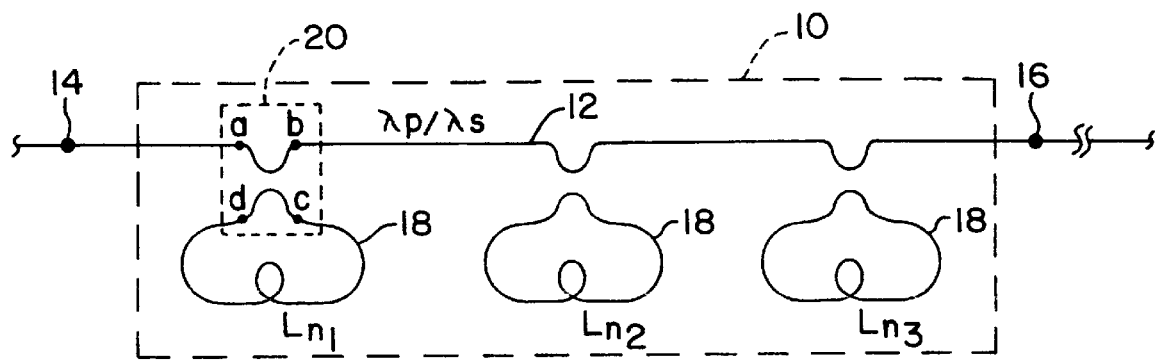
FIG. 1 is an exemplary, diagrammatic view of a device in accordance with this invention having three different lengths of either gain/filtering fiber or dispersion compensating fiber, respectively, each selectively optically coupled to a transmission/pass-through fiber via an optical switch.

Referring now to FIG. 1, an exemplary fiber optic device 10 having switchable characteristics is illustrated in diagrammatic form. The device includes a first or pass-through fiber waveguide 12 having one end 14 and another end 16 Device 10, as shown, also includes three lengths of circulating fiber 18, each length of circulating fiber 18 being coupled to the first fiber 12, intermediate ends 14, 16, via a respective N×N (N=2) optical switch 20. The optical switch 20 is a device well known to those skilled in the art and therefore comprises no invention except insofar as it is used in combination with the claimed invention disclosed herein. As is known, optical switch 20 may be a multiplexing/demultiplexing switch to couple any desired wavelength or wavelengths that are propagating along fiber 12.

For purposes of clarity, the invention will be described in the convention of optical signals traveling from left to right; however, the invention is not limited as such. When one or more optical signals of different wavelengths, such as 980 nm and/or 1550 nm, propagate along first fiber 12, which in practice will be interconnected with one or more fibers or devices at ends 14, 16, each optical switch 20 may be selected to be in an "off" position in which case the propagating signal will go from point 20(a) to 20(b) directly and not to point 20(c) and around fiber 18; or, each switch 20 may be selected to be in an "on" position in which case the propagating signal will go from point 20(a) to 20(c), around fiber 18 to point 20(d), over to point 20(b) and again onto fiber 12. Thus, for example, a 980 nm wavelength signal ($\lambda_1$) and a 1550 nm wavelength signal ($\lambda_2$) might enter fiber 12 at end 14. Switch 20 could be configured in an "off" position to carry $\lambda_1$ and $\lambda_2$ only along fiber 12; or in an "on" position to couple both $\lambda_1$ and $\lambda_2$ over to fiber 18 and then back to fiber 12; or, in a WDM aspect of switch 20, $\lambda_1$ could propagate only along fiber 12 while $\lambda_2$ selectively travels over fiber 18 and then again onto fiber 12. As such, it is obvious that device 10 can include from 1 to N lengths of circulating fiber $18_N$ with respective switches $20_N$.

In one aspect of the invention, each circulating length of fiber 18 is a dispersion compensating fiber. If device 10 contains N circulating lengths 18, each having a known dispersion value in ps/nm-km, then a variable amount of dispersion compensation can be selected in real time depending upon how many, if any, of the lengths $18_N$ are switched into the propagation path. Multiple circulating lengths $18_N$ may be of equal or different length to provide various amounts of dispersion. The device 10 therefore allows in field tuning or selection of variable amounts of dispersion (dispersion compensation).

In an alternative aspect, each length of circulating fiber 18 comprises a fiber that is doped with a substance that will amplify or absorb (filter) one or more optical signal wavelengths depending upon the dopant composition and concentration in the fiber, and the absence or presence of an optical pump signal in the event the dopant is a fluorescing dopant. In a preferred embodiment the dopant is an appropriate ionic form of a rare earth element such as erbium for example. Other known fluorescing dopants including, but not limited to, neodymium or praseodymium, or non fluorescing dopants such as iron, for example, may be used depending on the type of effect desired from the device. Moreover, each circulating length of fiber 18 has a cut-off wavelength $\lambda_C$ in the range from about 900 nm to 1600 nm.

Figure 2:
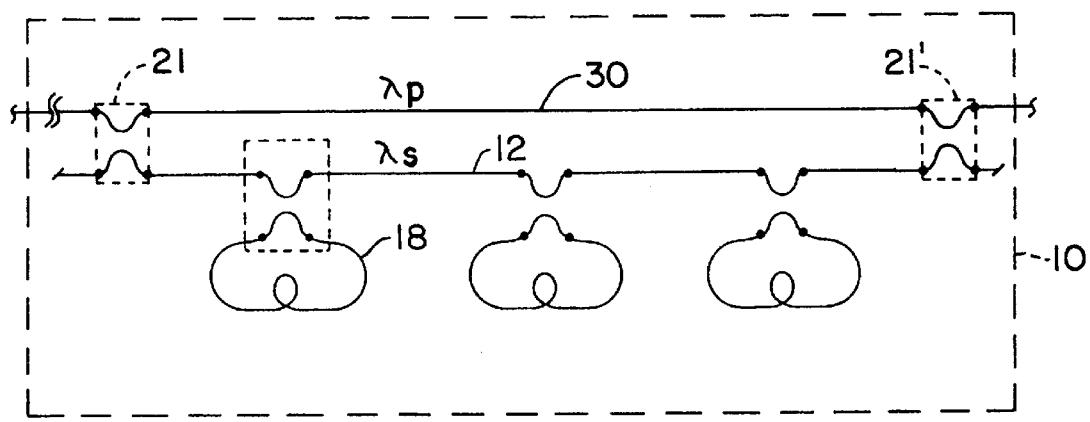
FIG. 2 is a diagrammatic view of a variation of the device in FIG. 1 wherein the pass-through fiber of the device is switchably coupled to a separate transmission pass-through fiber for further WDM control.

It will be appreciated that the device 10 can be interconnected with other portions of fiber or components at its ends 14, 16 either by direct coupling by a fusion splice, for example, as shown by the enlarged black dots in FIG. 1, or by interconnecting the ends 14, 16 with respective optical switches 21, 21' which are interconnected by a dedicated, second pass-through fiber 30 and are spliced to the other portions of fiber or components as shown in FIG. 2.

Figure 5:
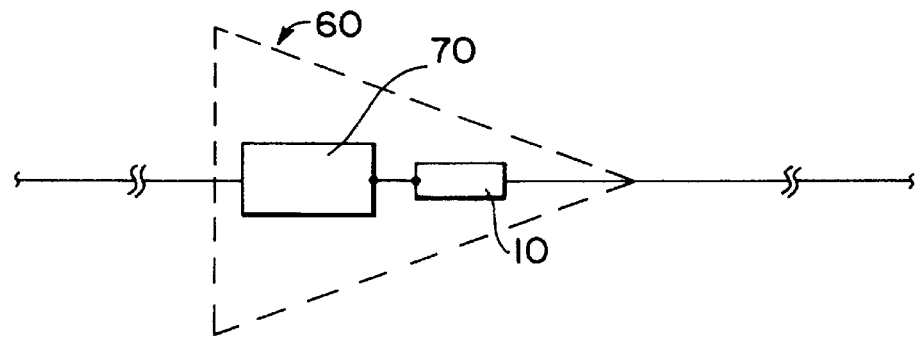
FIG. 5 is a schematic view of an optical amplifying component such as a gain platform including the switchable device of the invention.
Figure 6:
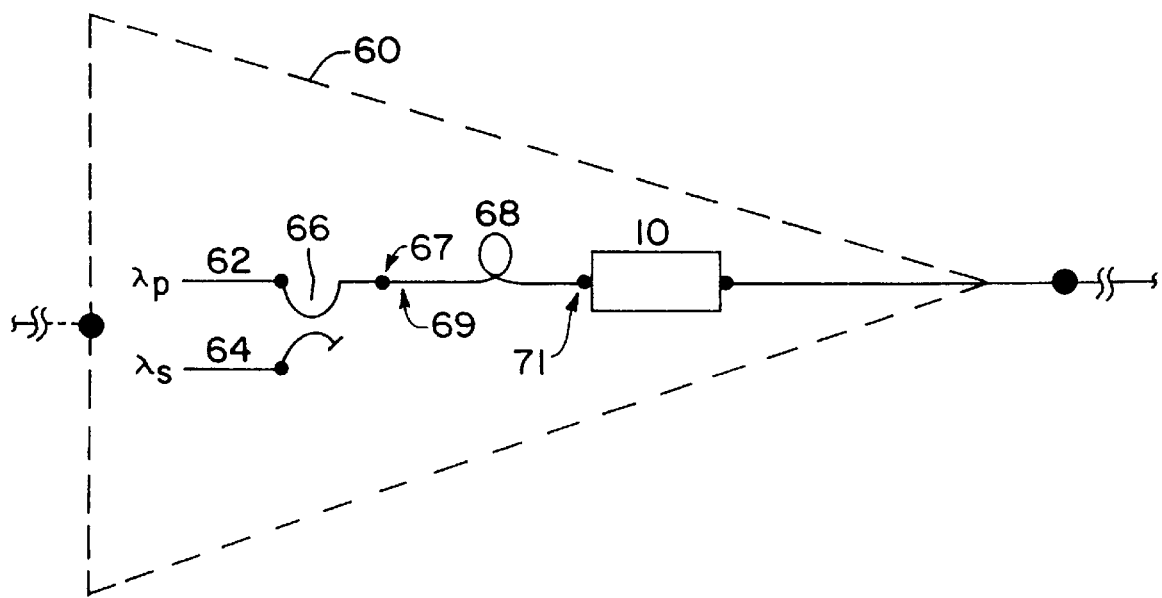
FIG. 6 is a diagrammatic view of the amplifying component of FIG. 5 including a single stage gain fiber.
Figure 7:
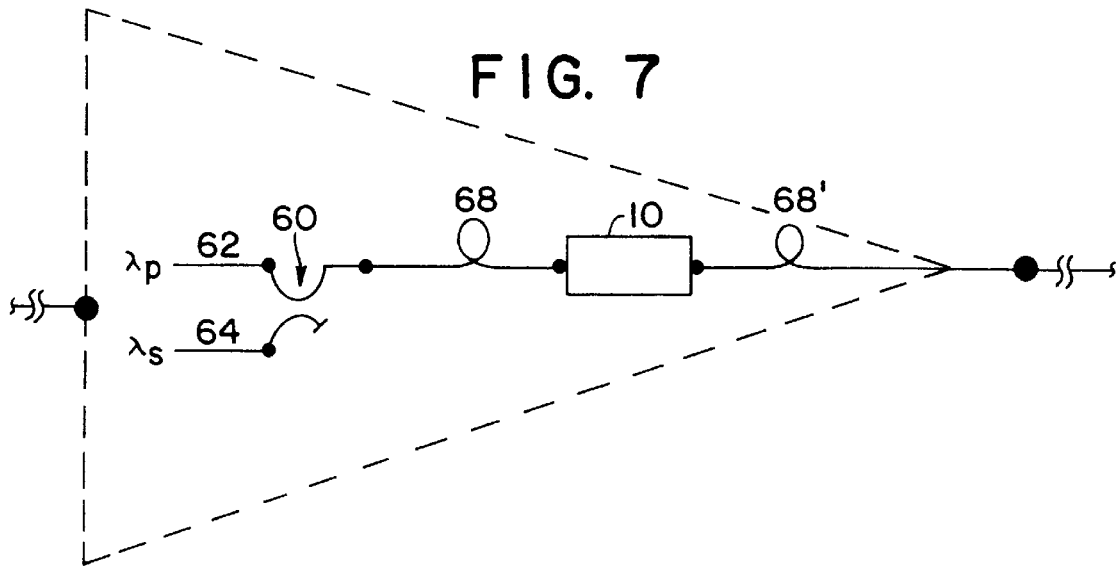
FIG. 7 is a diagrammatic view of the amplifying component of FIG. 5 including a dual stage gain fiber.

In another embodiment of the invention, an optical amplifying component, such as a passive or active gain platform or fiber amplifier, is illustrated with respect to FIGS. 5–7. An amplifying component 60 in general, in accordance with an aspect of the invention, is shown in FIG. 5. Component 60 comprises portion 70 which includes conventional amplifying component parts of a single gain stage amplifying component, well known to those skilled in the art and switchable device 10. Referring to FIG. 6, an optical pump signal $\lambda_P$ and an optical data signal $\lambda_S$ are carried by respective fibers 62, 64. Signal fiber 64 is coupled to pump fiber 62 by WDM coupler 66, the output 67 of which is connected to a first end 69 of rare earth doped gain fiber 68. As is known, various system parameters such as mode field diameter, for example, will determine whether the pump or the signal fiber is the fiber directly connected to the gain fiber or vice versa. As such, FIG. 6 (and FIG. 7, described below) is merely illustrative of such a design; however, the invention is not limited to the setup shown. As the pump and signal wavelengths propagate through doped fiber 68, preferably a fiber doped with erbium, the data signal gets amplified in the presence of the pump signal. Device 10 as described above, is connected to another end 71 of doped fiber 68 according to the connection scheme described with respect to FIGS. 1 and 2, above. In one aspect of the embodiment shown in FIG. 6, device 10 comprises first pass-through fiber 12 and one or more circulating fiber lengths 18 of dispersion compensating fiber wherein the data signal can be selectively switched by switch 20 so as to pass through none, or any combination of, the fiber lengths 18 to effect a desired amount of dispersion. Alternatively, fiber lengths 18 can be doped as described above such that the data signal, if desired, will be further amplified as it passes through each additional length 18 of doped gain fiber in which the pump signal is present to effect an amplifying component with field switchable variable gain. In the absence of sufficient remnant pump power in lengths 18, or if the dopant in not a fluorescing substance, device 10 will provide attenuation or filtering for the data or pump signals which are absorbed by the dopant in fiber length(s) 18. In any event, however, a field switchable device having variable gain, attenuation or dispersion is realized.

FIG. 7 schematically shows a dual gain stage amplifying component comprising pump fiber 62, signal fiber 64, coupler 66, first and second stage rare earth doped gain fibers 68, 68', and device 10 located intermediate the two gain stages 68, 68'. In this embodiment, fiber lengths 18 of device 10 are preferably dispersion compensating fibers, device 10 being located as shown due to the known benefits of locating dispersion compensating means intermediate the gain stages of the amplifying component. As before, device 10 can be interconnected to the gain fiber stages by either connection scheme illustrated in FIGS. 1 and 2.

Figure 3:
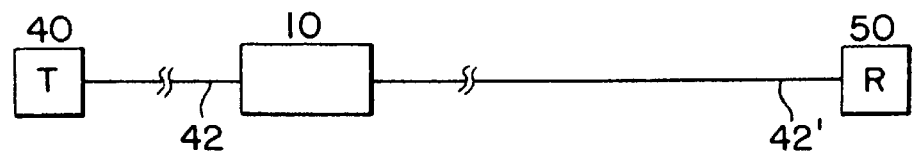
FIG. 3 is a diagrammatic view of an optical fiber transmission system, including a transmitter and a receiver, and the device shown in FIGS. 1 or 2

FIG. 3 schematically shows a fiber optic transmission system of the invention including a transmitter 40 and a receiver 50 at opposite ends of portions 42, 42' of a transmission line, and fiber optic device 10 positioned along the transmission line intermediate the transmitter and the receiver. In the embodiment illustrated in FIG. 3, device 10 is interconnectable in the system as described with respect to FIGS. 1 and 2, above. Each length 18 of circulating fiber is preferably dispersion compensating fiber or doped fiber to effect dispersion compensation or filtering, respectively.

Figure 4:
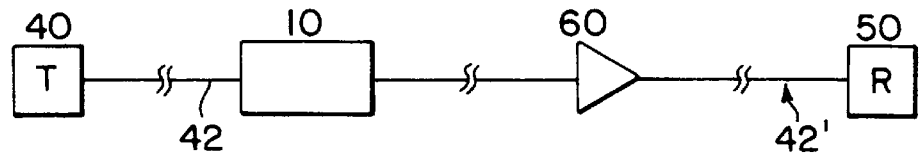
FIG. 4 is a diagrammatic view of the optical fiber transmission system of FIG. 3 including an amplifying component.

FIG. 4 shows the transmission system of FIG. 3 with an optical amplifying component 60, as described in reference to FIGS. 5–7, included as part of the system.

Figure 8:
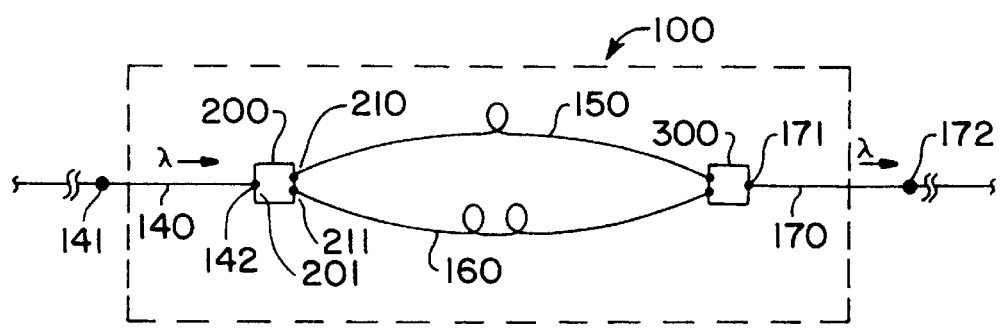
FIG. 8 is an exemplary, diagrammatic view of a device in accordance with another embodiment of the invention having N (N=2) different lengths of route fiber each selectively optically coupled to an input fiber via a 1×N (N=2) optical switch, and being connected to an output fiber by appropriate means.

In the embodiment of the invention illustrated in FIG. 8, a fiber optic device 100 having switchable operating characteristics includes an input fiber 140 connectable to a transmission fiber or other component at a first end 141 thereof, and a 1×N optical switch 200 optically connected to a second end 142 of the input fiber 140 at a single connection point 201 of the switch 200. A first route fiber 150 having known characterizing parameters (e.g., length, $\lambda_{cut-off}$, $\Delta$, dopant concentration, etc.) is optically connected to a first connection point 210 of the switch 200, and an $N^{th}$ route fiber 160 having known characterizing parameters that are different from any other route fiber, is connected to an $N^{th}$ connection point 211 of the switch 200 wherein a signal $\lambda$ propagating in the input fiber 140 towards the route fibers can be selectively switched by switch 200 to propagate in one of the N route fibers. Means 300 are also provided for optically interconnecting the N route fibers with a first end 171 of the output fiber 170, which can be further connected to another fiber or component at second end 172 The interconnecting means 300 may comprise any type of passive coupling device or optical switch well known to persons skilled in the art. Route fibers 150, 160 will preferably be doped with a substance that will fluoresce in the presence of pump or excitation energy. Typical dopants include, but are not limited to rare earths including erbium, neodymium, praseodymium, and others. The device shown in FIG. 8 is advantageous in that, as is well appreciated, a 1×N switch 200 is more immune to crosstalk and multipath interference effects than current N×N optical switches where N typically equals 2.

Figure 9:
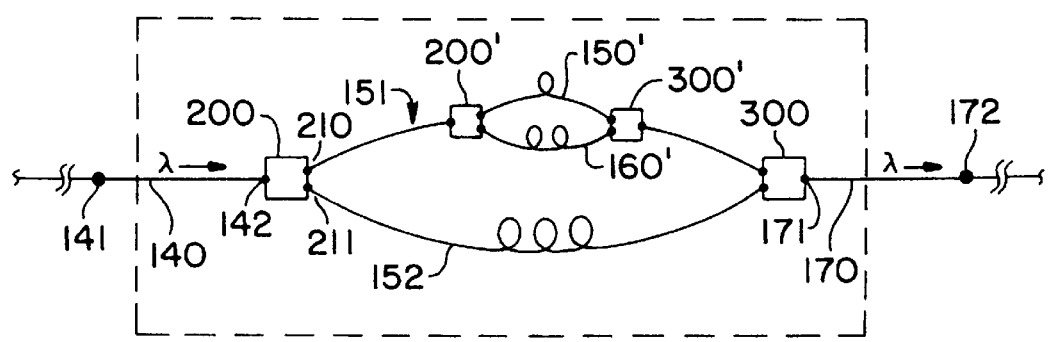
FIG. 9 is an alternative aspect of the invention shown in FIG. 8 in which another branch of route fibers is connected to one or more of the primary route fibers.

An alternative aspect of the embodiment described in connection with FIG. 8 is shown in FIG. 9. Like numerals are used to represent features of this aspect of the invention that are common to FIG. 8. In this aspect of the invention, the device 100' comprises another N route fibers 150', 160' which are respectively optically connected to route fiber 151 by another 1×N optical switch 200' in a manner identical to that described in connection with FIG. 8. A signal $\lambda$ propagating in input fiber 140 can be selectively routed to fiber 151 or 152 via optical switch 200. If $\lambda$ is propagated through route fiber 151, it can further be selectively routed through another one of route fibers 150', 160', and directed to downstream portion of route fiber 151 by means 300', and then to output fiber 170 by means 300. Alternatively, $\lambda$ can propagate in input fiber 140 and be selectively routed to fiber 152 via optical switch 200, and further propagated through output fiber 170 by means 300.

The embodiments of the invention illustrated in FIGS. 8 and 9 are particularly advantageous for maintaining gain uniformity in a doped fiber amplifier substantially independently of input signal power, which is of great utility for multichannel operation. The devices 100, 100' are suitable for construction as active or passive gain blocks, fiber optical amplifiers, or components in a fiber transmission system including a transmitter and a receiver.

While the invention has been described in connection with a presently preferred embodiment thereof, those skilled in the art will recognize that many modifications and changes may be made without departing from the true spirit and scope of the invention, which is intended to be defined solely by the appended claims.

What is claimed is:

1. An optical amplifier having switchable operating characteristics for uniformly amplifying a multichannel input signal, comprising:

N doped fiber gain media each having a different length, $L_N$, and each having a gain spectrum, wherein each gain spectrum is associated with an average saturated inversion value of the respective gain medium, for providing a uniform gain to the multichannel input signal, and further wherein each average saturated inversion value is a function of an amplifier operating condition and the length, $L_N$, of the respective gain medium;

a pump source in optical connection with the N doped fiber gain media;

an input 1×N switch connected to one end of each of the N doped fiber gain media for selectively directing the multichannel input signal to one of the N gain media as a function of a change in the amplifier operating condition, such that in operation all of the N gain media have a substantially equal average saturated inversion value as a function of the length, $L_N$ and a particular value of the amplifier operating condition; and an output N×1 switch connected to another end of each of the N doped fiber gain media, whereby the amplifier has a substantially constant average saturated inversion value for uniformly amplifying the multichannel input signal independent of the amplifier operating conditions.

2. The optical amplifier of claim 1, wherein the N doped fiber gain media are doped with a rare earth element.

3. The optical amplifier of claim 1, wherein the N doped fiber gain media are erbium doped fibers.

4. The optical amplifier of claim 1, wherein the amplifier operating conditions include at least one of signal input power and pump power.

5. A fiber optic transmission system, comprising:

a transmitter having an output;

a transmission fiber having one end in optical connection with the transmitter output, and another end;

an optical amplifier having an input in optical connection with said another end of the transmission fiber, wherein the optical amplifier has switchable operating characteristics for uniformly amplifying a multichannel input signal, comprising N doped fiber gain media each having a different length, $L_N$ and each having a gain spectrum, wherein each gain spectrum is associated with an average saturated inversion value of the respective gain medium, for providing a uniform gain to the multichannel input signal, and further wherein each average saturated inversion value is a function of an amplifier operating condition and the length, $L_N$, of the respective gain medium, an input 1×N switch connected to one end of each of the N doped fiber gain media for selectively directing the multichannel input signal to one of the N gain media as a function of a change in the amplifier operating condition, such that in operation all of the N gain media have a substantially equal average saturated inversion value as a function of the length, $L_N$ and a particular value of the amplifier operating condition, an output N×1 switch connected to another end of each of the N doped fiber gain media, and an output;

another transmission fiber having one end in optical connection with the output of the amplifier, and another end; and a receiver having an input in optical connection with said another end of the other transmission fiber.

6. The system of claim 5, wherein the N doped fiber gain media are doped with a rare earth element.

7. The system of claim 5, wherein the N doped fiber gain media are erbium doped fibers.

8. The system of claim 5, wherein the amplifier operating conditions include at least one of signal input power and pump power.

9. A method for maintaining a desired gain uniformity of a multichannel input signal from an optical amplifier substantially independently of amplifier operating conditions, comprising the step of:

maintaining a substantially constant average saturated inversion level in a gain medium of the amplifier independent of a change in the amplifier operating conditions, by including the steps of:

providing N(N>1) amplifying propagation paths for the input signal, wherein each propagation path has a different length, $L_N$; and providing a switch for selectively sending the input signal to one of the propagation paths, whereby the average saturated inversion level of the amplifier remains substantially constant independent of the amplifier operating conditions.

10. The method of claim 9 wherein the step of providing N (N>1) amplifying propagation paths includes N different lengths of rare earth-doped fiber.

* * * * *